United States Patent [19]
Giard, Jr. et al.

[11] Patent Number: 5,163,339
[45] Date of Patent: Nov. 17, 1992

[54] BICYCLE AUXILIARY HANDLE ASSEMBLY

[75] Inventors: Edward H. Giard, Jr., Oak Park; William F. Powers, II, Chicago, both of Ill.

[73] Assignee: Profile For Speed, Inc., Chicago, Ill.

[21] Appl. No.: 666,148

[22] Filed: Mar. 7, 1991

Related U.S. Application Data

[63] Continuation of Ser. No. 458,783, Dec. 29, 1989, abandoned.

[51] Int. Cl.$^5$ .................. B62K 21/12; B25G 3/20
[52] U.S. Cl. .................. 74/551.3; 74/551.1; 74/551.8; 403/374
[58] Field of Search .............. 74/551,1–551.9; 280/261, 279, 280, 263, 281.1; D12/178; 403/374, 367, 370, 371; 272/73, DIG. 4

[56] References Cited

U.S. PATENT DOCUMENTS

| 567,663 | 9/1896 | Snyder ...................... 74/551.1 |
| 4,023,436 | 5/1977 | Dodge ...................... 74/551.3 |
| 4,169,591 | 10/1979 | Douglas ...................... 272/73 |
| 4,345,756 | 8/1982 | Hoagland ............... 272/DIG. 4 X |
| 4,750,754 | 6/1988 | Lennon ...................... 280/261 |
| 4,873,886 | 10/1989 | Renner ...................... 74/551.8 |
| 4,878,337 | 11/1989 | Lennon ...................... 74/551.1 |
| 5,000,469 | 3/1991 | Smith ...................... 74/551.9 X |

FOREIGN PATENT DOCUMENTS

| 0053667 | 6/1982 | European Pat. Off. ........... 74/551.1 |
| 601729 | 8/1934 | Fed. Rep. of Germany ..... 74/551.8 |
| 426224 | 7/1911 | France ............................. 403/374 |
| 572258 | 6/1924 | France ............................. 403/374 |
| 2416156 | 8/1979 | France ............................. 74/551.1 |
| 2420474 | 10/1979 | France ............................. 403/374 |
| 278827 | 10/1951 | Switzerland ................... 74/551.1 |
| 1134458 | 1/1985 | U.S.S.R. ........................ 74/551.1 |
| 13053 | of 1896 | United Kingdom ............ 74/551.1 |
| 22064 | of 1907 | United Kingdom ............ 403/374 |

OTHER PUBLICATIONS

The Only Ergonomically Engineered Adjustable Handlebar (Profile—Leader by design, 6600 W. Armitage Avenue, Chicago, Ill. 60635)—Brochure printed in 1990.

*Primary Examiner*—Vinh T. Luong
*Attorney, Agent, or Firm*—Kinzer, Plyer, Dorn, McEachran & Jambor

[57] ABSTRACT

An adjustable auxiliary handlebar assembly for bicycles and the like include an auxiliary handlebar having arm portions and a hand gripping portion. There are brackets to mount the auxiliary handlebar to the conventional handlebar of a bicycle. The auxiliary handlebar arm portions are mounted to the brackets by the use of extension arms, each of which has an expandable portion. A wedge member and a cooperating threaded rod are used to provide an adjustable connection between the extension arms and the auxiliary handlebar and thus adjustment of the position of the auxiliary handlebar relative to the conventional bicycle handlebar.

10 Claims, 1 Drawing Sheet

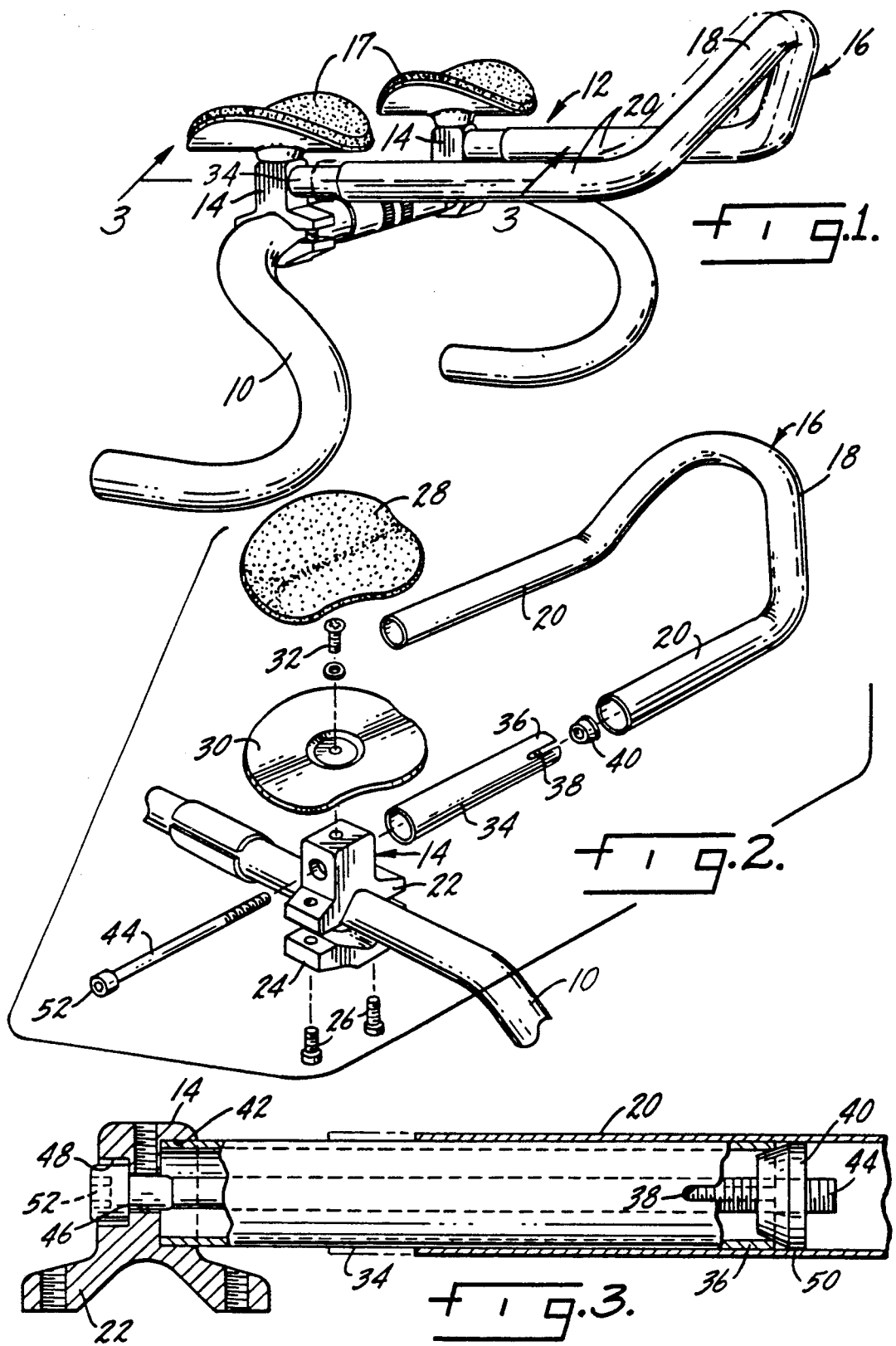

BICYCLE AUXILIARY HANDLE ASSEMBLY

This is a continuation of application Ser. No. 07/458,783, filed Dec. 29, 1989 now abandoned.

SUMMARY OF THE INVENTION

The present invention relates to auxiliary handlebars for bicycles and in particular to an auxiliary handlebar which is easily adjusted.

A primary purpose of the invention is to provide an adjustable auxiliary handlebar assembly for use on a bicycle.

Another purpose is to provide a simply constructed reliable adjustable connection between an auxiliary handlebar and the conventional handlebar of a bicycle.

Another purpose is an auxiliary handlebar assembly which includes brackets for mounting the auxiliary handlebar, and means for adjusting the position of the auxiliary handlebar relative to the brackets.

Other purposes will appear in the ensuing specification, drawings and claims.

BRIEF DESCRIPTION OF THE DRAWINGS

The invention is illustrated diagrammatically in the following drawings wherein:

FIG. 1 is a perspective view of the auxiliary handlebar assembly of the present invention, as mounted on conventional bicycle handlebars, FIG. 2 is an exploded view illustrating the parts of the auxiliary handlebar assembly, and FIG. 3 is a partial axial section illustrating the means for adjusting position of the auxiliary handlebar assembly.

DESCRIPTION OF THE PREFERRED EMBODIMENT

The present invention is directed to an auxiliary handlebar assembly which allows a cyclist to control a bicycle while assuming a profile which provides the least wind resistance. The auxiliary handlebar assembly allows the cyclist to lean over the front of the bicycle, steer by the hand gripping portion of the auxiliary handlebar, and rest the arms, generally adjacent and forward of the elbows, on arm rests which are a part of the auxiliary handlebar. The auxiliary handlebar may also include a conventional gearshift.

In FIG. 1, the conventional handlebars of a racing type bicycle are indicated at 10. The auxiliary handlebar assembly is indicated generally at 12. The assembly 12 includes a pair of brackets 14, each of which is fastened to handlebar 10, an auxiliary handlebar 16 and a pair of arm rests 17, one mounted upon each of the brackets 14.

FIG. 2 illustrates the specific parts of the auxiliary handlebar assembly. The auxiliary handlebar 16 includes a hand gripping portion 18, generally curved and having a slight upward direction, which is integral with arm portions 20. Each of brackets 14 includes an upper bracket member 22 and a lower bracket member 24, which are attached together and mounted on the bicycle handlebar by means of socket head screws 26. The arm rests 17 include an upper foam disk 28 which may be adhesively secured to a plastic base 30, the base being secured by a button head screw 32 to the top of upper bracket member 22.

The adjustable mounting for the auxiliary handlebar 16 includes an extension arm 34 for each of the arm portions 20 of the auxiliary handlebar. The extension arms each have an expandable end 36 which is made so by means of a plurality of axially extending slots 38. A wedge nut 40 extends within the expandable end 36 of each extension arm and is used to fix the position of the auxiliary handlebar to the extension arms.

As particularly shown in FIG. 3, each of the extension arms extends within a bore 42 in upper bracket member 22. A stem bolt of threaded rod 44 extends into a bore 46 on the opposite side of upper bracket member 22, with bore 46 having an enlarged portion 48 for the head of the stem bolt. The stem bolt extends through the bracket, through the extension arm, and is in threaded engagement with the wedge nut. Rotation of the stem bolt is effective to draw the wedge nut into the extension arm, expanding it in the area of slots 38 to thereby form an interference fit between the extension arm and the auxiliary handlebar arm portions 20. This fixes the position of the auxiliary handlebar relative to the extension arms and thus relative to the brackets and the conventional handlebar 10.

As particularly shown in FIG. 3, the outer diameter of each extension arm, in an unexpanded condition, is slightly less than the inner diameter of the auxiliary handlebar arm portions. The auxiliary handlebar easily slides over the extension arms. The wedge nut has a maximum outer diameter, as at 50, which is greater than the inner diameter of the extension arms. The wedge nut can only be drawn in a distance sufficient to cause expansion of portion 36 of the extension arms, locking the extension arms to the auxiliary handlebar arm portions.

When the cyclist wishes to change the position of the auxiliary handlebar, the stem bolts are partially backed out of the wedge nuts. It may be necessary to first tap a stem bolt to loosen the wedge nut. Each stem bolt has a socket 52 which is designed to receive an allen wrench or the like for use in turning the stem bolts out of the wedge nuts. Once the wedge nuts are loose, the auxiliary handlebar can be moved to any desired position on the extension arms and for example there may be as much as three inches of adjustment. When the auxiliary handlebar is in the desired position, the stem bolts are tightened, drawing the wedge nuts into the expandable portion of the extension arms to again provide the interference fit between the extension arms and the auxiliary handlebar.

Although the invention has been shown as providing a specific type of adjustment between the auxiliary handlebar and the mounting brackets on the bicycle handlebar, the invention should not be so limited. Other forms of adjustment may also be used. What is important is to provide an auxiliary handlebar of the general type described which is adjustable relative to the conventional handlebar.

Whereas the preferred form of the invention has been shown and described herein, it should be realized that there may be many modifications, substitutions and alterations thereto.

The embodiments of the invention in which an exclusive property or privilege is claimed are defined as follows:

1. An adjustable auxiliary handlebar assembly for a bicycle handlebar including bracket means for use in attaching the assembly to the bicycle handlebar, an auxiliary handlebar having an arm portion and a hand gripping portion, an extension arm extending within said auxiliary handlebar arm portion and mounted to said bracket means, said extension arm including an expandable portion positioned within said auxiliary handlebar arm portion, and adjustment means to provide for movement of said auxiliary handlebar arm portion relative to said extension arm to vary the position of said auxiliary handlebar relative to the bicycle handlebar, said adjustment means including a wedge member positioned, at least in part, within said expandable portion, and means for moving said wedge member into said expandable portion to expand the extension arm within the auxiliary handlebar arm portion, to form an interconnection therebetween.

2. The auxiliary handlebar assembly of claim 1 further characterized in that the means for moving said wedge member includes a rod extending through said bracket means and into said extension arm and being threadedly engaged with said wedge member.

3. The auxiliary handlebar assembly of claim 2 further characterized in that the expandable portion of said extension arm is at the end of the extension arm within said auxiliary handlebar arm portion, said expandable portion including a plurality of axially extending slots in said end of said extension arm.

4. An adjustable auxiliary handlebar assembly in combination with the bicycle including an auxiliary handlebar having a pair of spaced arm portions joined by a hand gripping portion a pair of brackets, one for each arm portion, for use in mounting the auxiliary handlebar to a bicycle handlebar, and adjustment means to provide for forward and rearward adjustment of the position of said auxiliary handlebar relative to the bicycle handlebar, including an extension arm for each auxiliary handlebar arm portion, said extension arms being mounted in said brackets and extending within said auxiliary handlebar arm portions, said extension arms each including an expandable portion positioned within said auxiliary handlebar arm portion, and means for causing expansion of said expandable portions to interconnect said auxiliary handlebar and said extension arms.

5. The auxiliary handlebar assembly of claim 4 further characterized in that said adjustment means includes an extension arm for each auxiliary handlebar arm portion, said extension arms being mounted in said brackets and extending within said auxiliary handlebar arm portions.

6. The auxiliary handlebar assembly of claim 4 further characterized in that the means to expand said extension arm expandable portions include a wedge member for each extension arm.

7. The auxiliary handlebar assembly of claim 6 further characterized by and including a rod for each bracket/extension arm, each rod being threadedly engaged with said wedge member, with rotation of said rod causing movement of the wedge member to move it into the expandable portion of the extension arms.

8. The auxiliary handlebar assembly of claim 7 further characterized in that each rod is a bolt extending from one side of each bracket, through the bracket, into an extension arm and being threadedly engaged with its cooperating wedge member.

9. The auxiliary handlebar assembly of claim 4 further characterized in that the expandable portion of each extension arm is formed by a plurality of axially extending slots in the extension arm.

10. The auxiliary handlebar assembly of claim 4 further characterized by and including an arm rest mounted upon each of said brackets.

* * * * *